US007066198B2

(12) United States Patent
Smith

(10) Patent No.: US 7,066,198 B2
(45) Date of Patent: Jun. 27, 2006

(54) PRESSURIZED FLUID CONTROLLER USING TILT / PUSH / PULL OPERATOR

(76) Inventor: Jason L. Smith, Junction Way, San Jose, CA (US) 95131

( * ) Notice: Subject to any disclaimer, the term of this patent is extended or adjusted under 35 U.S.C. 154(b) by 104 days.

(21) Appl. No.: 10/749,968

(22) Filed: Jan. 2, 2004

(65) Prior Publication Data

US 2005/0145283 A1 Jul. 7, 2005

(51) Int. Cl.
*F16P 1/00* (2006.01)

(52) U.S. Cl. ....................................... 137/377; 137/636

(58) Field of Classification Search ............. 137/636.2, 137/636.3, 636, 377
See application file for complete search history.

(56) References Cited

U.S. PATENT DOCUMENTS

| | | | | |
|---|---|---|---|---|
| 3,056,867 | A * | 10/1962 | Eitel | 200/81 R |
| 3,131,574 | A * | 5/1964 | Clingerman | 74/471 R |
| 3,589,242 | A * | 6/1971 | Peterson et al. | 91/523 |
| 4,206,602 | A * | 6/1980 | Watson et al. | 60/433 |
| 4,237,629 | A * | 12/1980 | Schmidt | 37/234 |
| 4,296,773 | A | 10/1981 | Harshman et al. | 137/312 |
| 4,404,991 | A | 9/1983 | Cullen | 137/636.1 |
| 4,421,135 | A * | 12/1983 | Harshman et al. | 137/312 |
| 4,680,465 | A * | 7/1987 | Stevens | 250/229 |
| 4,812,802 | A | 3/1989 | Watanabe | 338/128 |
| 5,042,314 | A | 8/1991 | Rytter et al. | 74/335 |
| 5,692,541 | A * | 12/1997 | Brown | 137/636.2 |
| 5,743,297 | A * | 4/1998 | Mueller | 137/636.2 |
| 6,601,386 | B1 * | 8/2003 | Hori et al. | 60/443 |
| 6,655,229 | B1 * | 12/2003 | Yamamoto et al. | 74/471 XY |

* cited by examiner

*Primary Examiner*—Eric Keasel
*Assistant Examiner*—Craig Schneider
(74) *Attorney, Agent, or Firm*—Paul Hentzel

(57) ABSTRACT

An intuitive pressurized fluid controller using tilt/push/pull (3 axis) operator includes a swivel joint such that it can move axially and tilt. A first array of valves is arranged to be activated as the lever tilts. A second array of valves is arranged so they can be activated when the lever is pulled axially. A third array of valves is arranged so they can be activated when the lever is pushed axially. When plumbed to a plurality of pressurable positioners supporting heavy equipment, the first array of valves can control the equipment pitch and roll as the lever is tilted, and the second/third arrays of valves can control the equipment elevation as the lever is pulled/pushed.

4 Claims, 6 Drawing Sheets

PRESSURIZED FLUID CONTROLLER USING TILT / PUSH / PULL OPERATOR

BACKGROUND

1. Field of Invention

This invention provides a pressure selector valve including a lever operator which is capable of broader (more) controlling functions than current joy stick pressure valve controllers. While the invention has indeed a wide utility controlling pneumatic and hydraulic machine functions, it is well suited to controlling pitch, roll, and elevation of heavy equipment needing precision positioning. One example of these applications includes docking of robot machines and circuit board testing fixtures in the industry of semiconductor manufacturing equipment.

Another application example is precise positioning of heavy leaded glass windows and moving radiation shielded doors within a nuclear facility.

Another application example is elevation and tilting control of heavy manufactured products (such as military tanks or motor homes) at various process stations along a factory production line.

2. Description of Prior Art

Current joy stick controllers such as that disclosed in U.S. Pat. No. 4,404,991 granted to Cullen Sep. 20, 1983; and U.S. Pat. No. 4,296,773 granted to Harshman and Dietrich Oct. 27, 1981, use a lever and attached circular cam to selectively activate four valves arranged in one array (oriented axially to and circularly around the lever). A limitation of these joy stick controllers are that the single four valve array has limited machine control utility. For example, if these joy stick controllers were plumbed to four air bags supporting a robot, they could only control robotic tilt (pitch and roll). Additional valve control for elevation is missing.

Because pressure joy stick controllers have functional limitations, some industries do not use them at all or use them in concert with additional valves or switches thus adding to the system complexity and loss of some intuitive understanding. For example, the semiconductor industry (for precision robot docking) uses an electric joy stick controller such as that disclosed in U.S. Pat. No. 5,042,314 granted to Rytter, Boucher, and Kelley Aug. 27, 1991; and U.S. Pat. No. 4,812,802 granted to Watanabe Mar. 14, 1989, to control electric motor driven ball jacking (lifting) screws to control all three functions pitch, roll and elevation. This electric system has serious limitations for the industry. The electric jack screw actuators are very expensive, heavy, and complex. Also the jack screws are about a foot high, can not fit under the robot structure, and must be bracket mounted to the outside the robot significantly increasing the robot area footprint.

This invention solves the limitations of the electric jack screw robot docking application above. The invention provides a means to use only pneumatic controls and actuators (air bags for example) with advantages of low cost, light weight, and intuitive simplicity. The invention pneumatic system components can fit easily under the robot structure (air bags can be as thin as 0.7 inches thick). The invention pneumatics can control roll, pitch, and elevation of the robot by uniquely controlling inflating and exhausting of the four supporting air bags.

Other features and advantages of the invention will become apparent to those skilled in the art during the course of the following description.

SUMMARY OF THE INVENTION

My invention discloses a pressure selector joy stick type mechanism including a tiltable lever operator which includes axial motion (push and pull movement) as well. The lever tilting motion selectively actuates a first array of four valves providing machine control. My invention has connected to the lever a second actuator and two more arrays of four valves oriented circularly about the lever, and near the second actuator. Valves of the second array actuate when the lever is pulled axially. Valves of the third array actuate when the lever is pushed axially. As can be understood, the invention fluidic controller can operate many functions (has broad utility) when plumbed to machinery: The invention lever operator can be tilted to control some machinery functions, and can be pulled to control other machinery functions, and can be pushed to control still other machinery functions.

Prior art pressure joy stick valves are sometimes limited to tilted axis only control of machinery, and must resort to (more complex and less intuitive) additional external valves to add additional machinery functional control.

My invention has the advantages of:

i. costing less than prior art pressure joy stick valves with added valve operators ii. being more intuitive to control supported equipment pitch, roll, and elevation than prior art fluidic joy stick valves with added valve operators:

a. intuitive because as the single lever is tilted to left/right roll is controlled b. intuitive because as the single lever is tilted forward/backward pitch is controlled c. intuitive because as the single lever is pulled/pushed elevation is controlled iii. being less costly, lighter weight, less complex, and thinner (to be positioned under machine structures) than are electric joy stick systems operating motorized jack screw positioners.

By way of example, my invention is illustrated herein by the accompanying drawing, wherein:

DRAWING FIGURES

DESCRIPTION OF THE PREFERRED EMBODIMENTS

Figure 1:
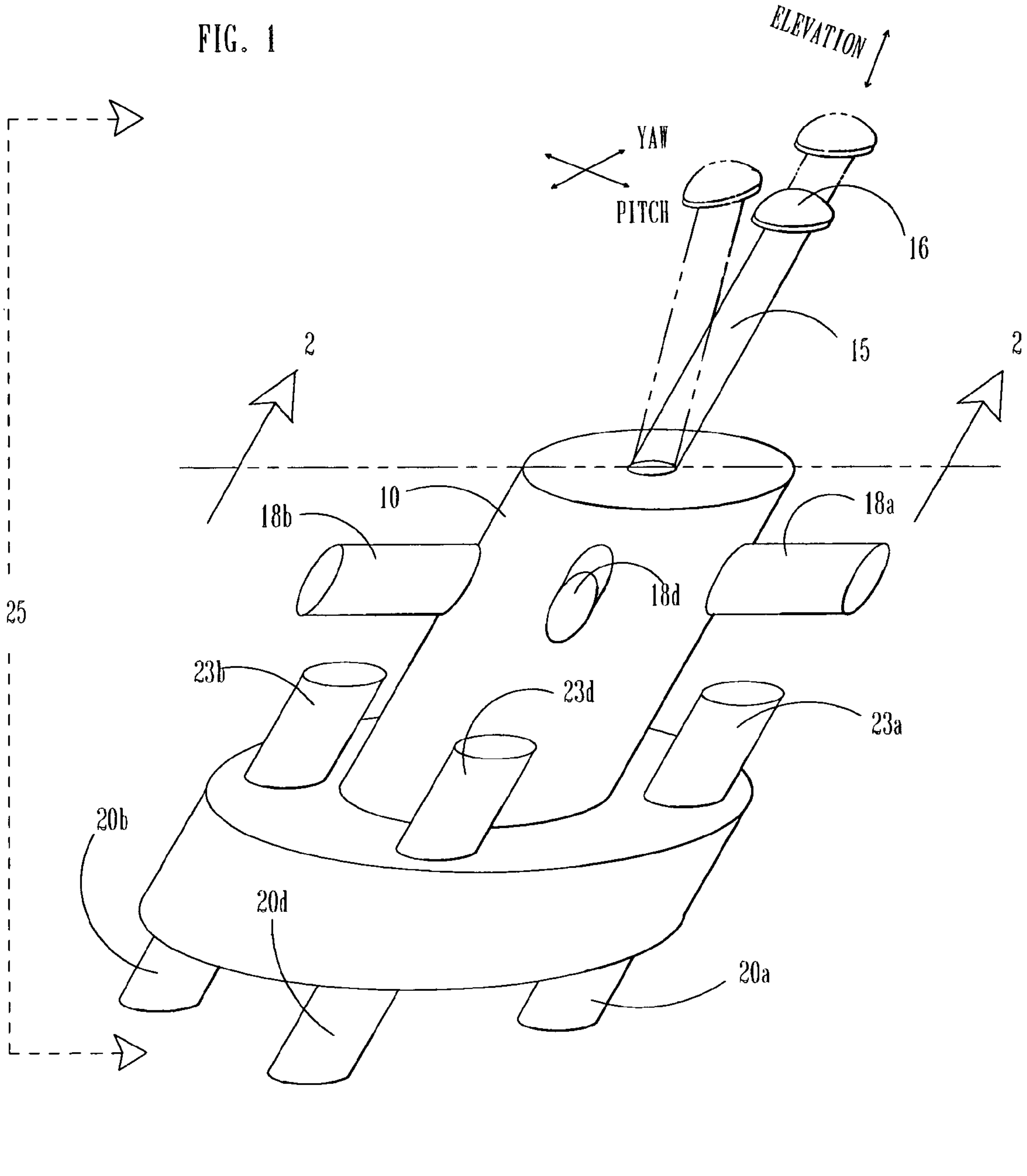
FIG. 1 is a perspective view of the pressurized fluid controller using tilt/push/pull operator.

1. The Invention Pressurized Fluid Controller Using Tilt/Push/Pull Operator Preferred Embodiment in General The view of FIG. 1 shows my invention "pressurized fluid controller using tilt/push/pull operator" referred to as numeral 25. Assembly 25 includes a housing 10, with four bores through which are attached a first set of four valves (three shown) 18*a*, 18*b*, 18*c*, 18*d*. The housing 10 includes an additional four bores through which are four more valves (three shown) 23*a*, 23*b*, 23*c*, 23*d*. The housing 10 includes a final four bores through which are attached a third set of four final valves (three shown) 20*a*, 20*b*, 20*c*, 20*d*.

Figure 2:
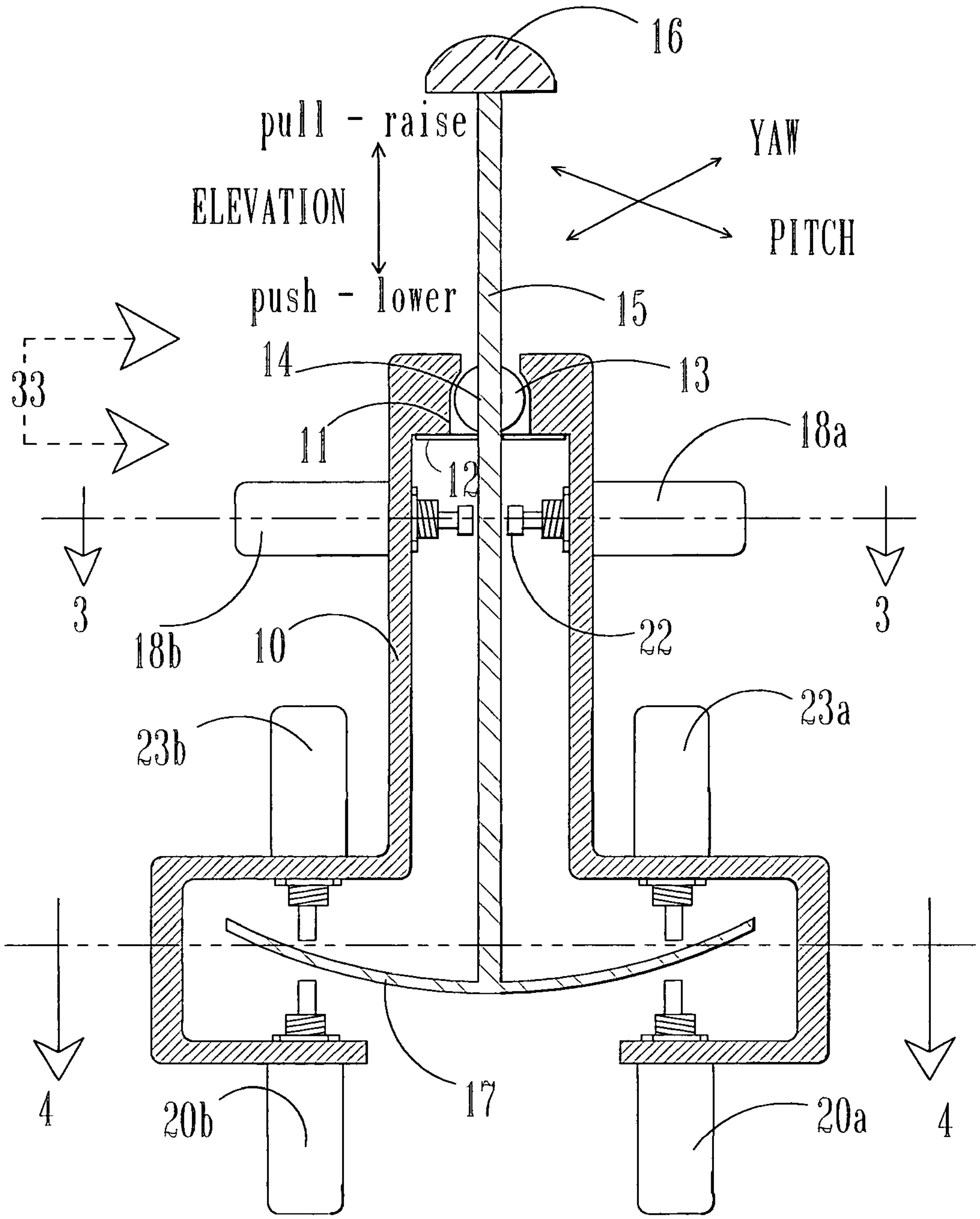
FIG. 2 shows a fragmentary sectional elevation view taken as suggested by lines 2—2 of FIG. 1 with more detail shown of internal valve actuation and positioning.

FIG. 2 best shows confinement of a swivel joint (referred to as numeral 33) within a spherical bore 11 in the housing 10. A ball 13 with a through hole 14 is held within the spherical bore 11. Through the hole 14 slips a lever 15 so it can be slideably pulled and pushed axially as well as tilted. Attached further along the lever 15 is an actuator 17. At the opposite end of the lever 15 is a knob 16 facilitating easy finger movement of the lever 15. Wherein, as the lever 15 is lifted or pulled axially, the actuator 17 actuates the valves 23*a*, 23*b*, 23*c*, 23*d*. Wherein, as the lever 15 is pushed axially, the actuator 17 actuates the valves 20*a*, 20*b*, 20*c*, 20*d*.

In FIG. 1, one set of phantom lines shows the lever 15 and the knob 16 in the pulled out (axially extended) position. The other set of phantom lines show the lever 15 and the knob 16 in a tilted position. The solid line shows the lever 15 and the knob 16 in the neutral position occurring when all the valves 23*a*, 23*b*, 23*c*, 23*d*, 20*a*, 20*b*, 20*c*, 20*d*, 18*a*, 18*b*, 18*c*, 18*d* are not actuated and valve return springs force the lever 15 and the knob 16 and the actuator 17 (shown in FIG. 2) to this position.

Figure 5:
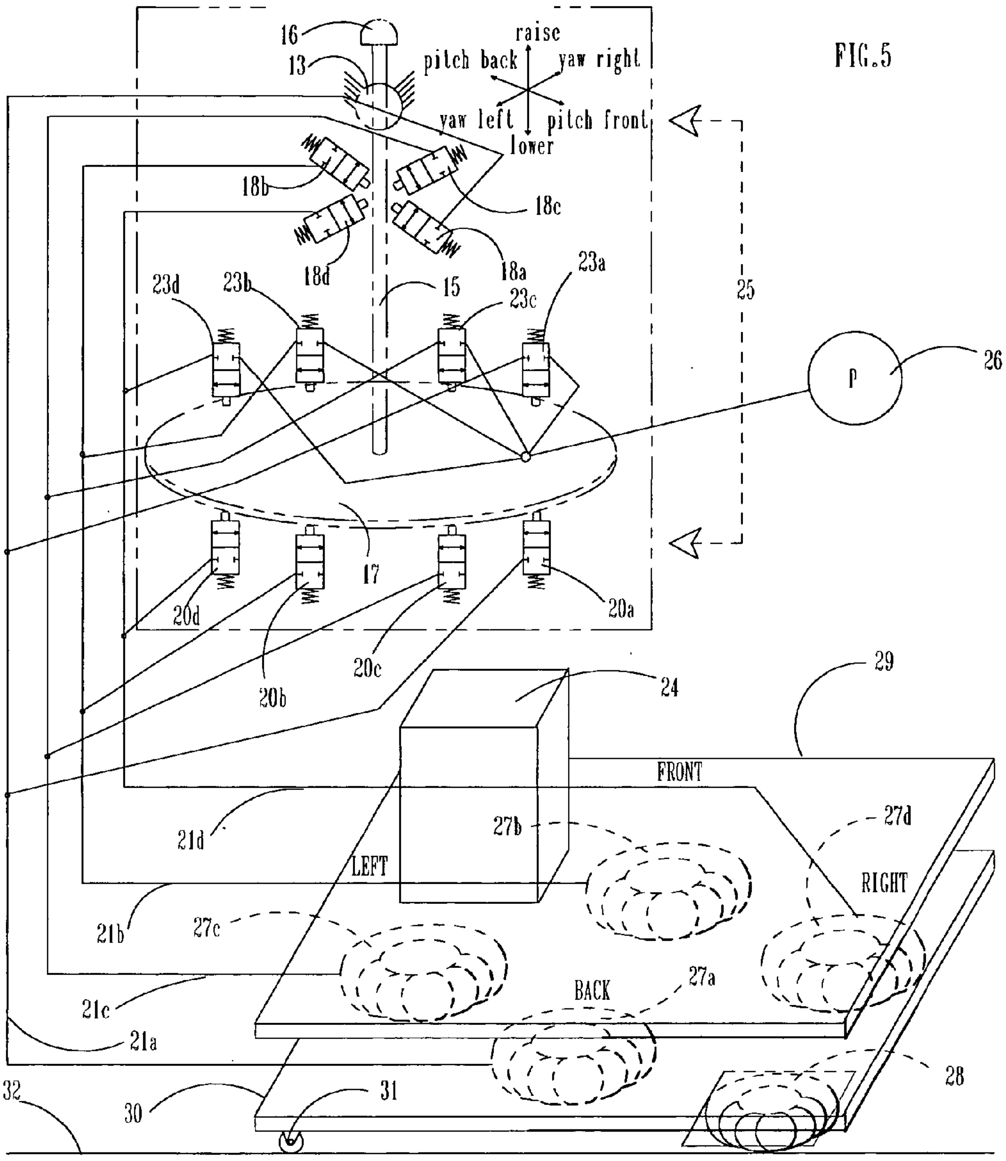
FIG. 5 shows a single pressure system schematic of the pressurized fluid controller using tilt/push/pull operator in association with pressurizable air bags and a heavy equipment supporting and positioning frame.

FIG. 5 best shows that opening of the normally closed valves 23*a*, 23*b*, 23*c*, 23*d* (by pulling the lever 15 upward) conveys pressurized fluid from a pressure supply 26 to an array of four air bags 27*a*, 27*b*, 27*c*, 27*d*. The pressure supply 26 is shown encircled by "P". The air bags 27*a*, 27*b*, 27*c*, 27*d* are shown sandwiched between an upper positioning frame 29 and a lower positioning frame 30. As the air bags 27*a*, 27*b*, 27*c*, 27*d* are pressurized, they elevate the upper positioning frame 29 and a heavy equipment 24 placed thereon.

As the lever 15 of FIG. 2 is depressed or pushed axially, the actuator 17 actuates simultaneously normally closed valves 20*a*, 20*b*, 20*c*, 20*d*. FIG. 5 best shows that opening of the valves 20*a*, 20*b*, 20*c*, 20*d* conveys pressurized fluid away from the four air bags 27*a*, 27*b*, 27*c*, 27*d* to the atmosphere (exhausting). As the air bags 27*a*, 27*b*, 27*c*, 27*d* exhaust, they lower the elevation of the upper positioning frame 29 and heavy equipment 24 thereon.

Figure 3:
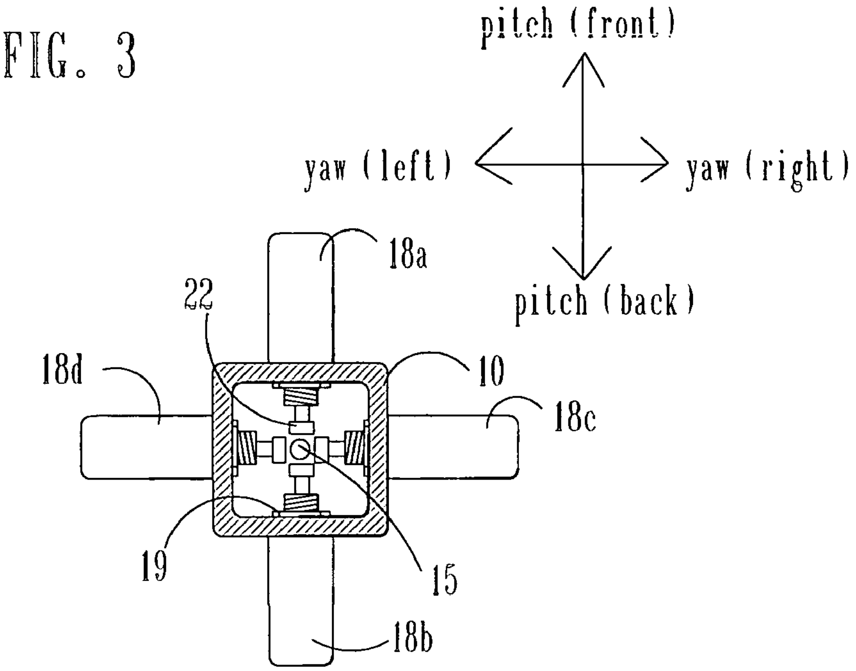
FIG. 3 shows a transverse vertical section taken as suggested by lines 3—3 of FIG. 2 with more detail shown of internal valve actuation and positioning.

As the lever 15 shown in FIGS. 2 and 3 is tilted it actuates normally closed valves 18*a*, 18*b*, 18*c*, 18*d* (individually or in close pairs). FIG. 5 best shows that tilting the lever 15 back opens the valve 18*a* conveying pressurized fluid away from the air bag 27*a* to the atmosphere (exhausting). As the air bag 27*a* exhausts, it lowers the back of the upper positioning frame 29 and the heavy equipment 24, thereby changing pitch in the back direction.

Tilting the lever 15 forward opens the valve 18*b* which conveys pressurized fluid away from the air bag 27*b* to the atmosphere (exhausting). As the air bag 27*b* exhausts, it lowers the front of the upper positioning frame 29 and the heavy equipment 24, thereby changing pitch in the forward direction.

Tilting the lever 15 to the right opens the valve 18*d* which conveys pressurized fluid away from the air bag 27*d* to the atmosphere (exhausting). As the air bag 27*d* exhausts, it lowers the right side of the upper positioning frame 29 and the heavy equipment 24, thereby changing roll in the right direction.

Tilting the lever 15 to the left opens the valve 18*c* which conveys pressurized fluid away from the air bag 27*c* to the atmosphere (exhausting). As the air bag 27*c* exhausts, it lowers the left side of the upper positioning frame 29 and the heavy equipment 24, thereby changing roll in the left direction.

Thus described is a preferred embodiment of the pressurized fluid controller using tilt/push/pull operator as used for adjusting roll, pitch, and elevation of the heavy equipment 24 supported by the four pressure air bags 27*a*, 27*b*, 27*c*, 27*d:*

As the lever 15 is intuitively moved to the right, the heavy equipment 24 rolls to the right.

As the lever 15 is intuitively moved to the left, the heavy equipment 24 rolls to the left.

As the lever 15 is intuitively moved forward, the heavy equipment 24 pitches to the front.

As the lever 15 is intuitively moved backward, the heavy equipment 24 pitches to the back.

As the lever 15 is intuitively pulled upward axially, the heavy equipment 24 elevates or rises.

And, as the lever 15 is intuitively pushed downward axially, the heavy equipment 24 lowers.

Although not part of the assembly 25, it can be helpful to mention a good methodology to position the equipment 24 (the lower positioning frame 30) on a factory floor 32 as shown in FIG. 5. So far description correctly has been limited only to the heavy equipment 24 pitch, roll, and elevation positioning. However, it is typical that workers operating the equipment 24 need to move the equipment 24 about the floor 32 so as to bring the equipment 24 in precision close position for docking or attachment to an additional machine. This floor 32 movement is most often accomplished by attaching wheels under the lower positioning frame 30. A wheel 31 is shown in FIG. 5. Note that the wheel 31 to function is necessarily cantered and so can not make tiny XY positioning moves across the floor 32 well. If a worker moving the equipment 24 lines up the equipment 24 properly as to pitch, roll, and elevation, only to be unable to dock the equipment 24 with it's mating machinery because the wheel 31 will not cooperate and allow a simple ⅛ inch XY movement in floor direction then the docking operation can not be preformed! It is often a far better methodology to use air bearings under the lower positioning frame 30 than it is to use wheels to move the equipment 24. An air bearing 28 is shown in FIG. 5. In a real life application, the worker would not use both the wheel 31 and the air bearing 28 at the same time under the lower positioning frame 30, but one of each is shown for explanatory reasons.

At best a good complete heavy equipment positioning system could include the four air bags 27*a*, 27*b*, 27*c*, 27*d*, the assembly 25 (controlling pitch, roll, and elevation); and the four air bearings 28 allowing minute/unimpeded/omni directional/and near frictionless floor XY movement of the equipment 24.

The assembly 25 described is capable of controlling the heavy equipment 24 pitch, roll, and elevation with worker one hand motion and in the most intuitive manner possible. Furthermore, the assembly 25 is robust, reliable, economical, versatile, and simple in construction. The assembly 25 completely controls the heavy equipment 24 pitch, roll, and elevation alignment for purposes such as docking or attachment to another piece of machinery without need to include additional valving, additional joy stick controllers, or introduce a complicated problematic electrical subsystem with additional switches.

2. Invention Construction Detail

More details of the assembly 25 operation and construction show in the views of FIGS. 2 and 3. One construction of the housing 10 is machining out of metal or plastic in the shape of a square hollow tube near the knob 16 end. This shape easily allows for the drilling of four mounting holes to attach each of the four valves 18*a*, 18*b*, 18*c*, 18*d* with a nut 19. Each of the valves 18*a*, 18*b*, 18*c*, 18*d* can have a short cap 22 attached to each valve stem to increase the valve stem contact surface with the lever 15 to a diameter slightly less than the lever 15 diameter. The caps 22 can be attached to the stems with set screws (not shown). The caps 22 increased area is beneficial as it allows the lever 15 to more easily engage the particular valve 18*a*, 18*b*, 18*c*, 18*d* even if the lever's 15 approach angle is not exactly 90 degrees. The mounting hole location should be selected far enough away axially from the swivel joint 33 so the tilting movement of the lever 15 in the plane of the valves 18*a*, 18*b*, 18*c*, 18*d* about equals the valve stroke plus allowing about 1⁄16 inch clearance between the lever 15 and the attached valve cap 22.

Figure 4:
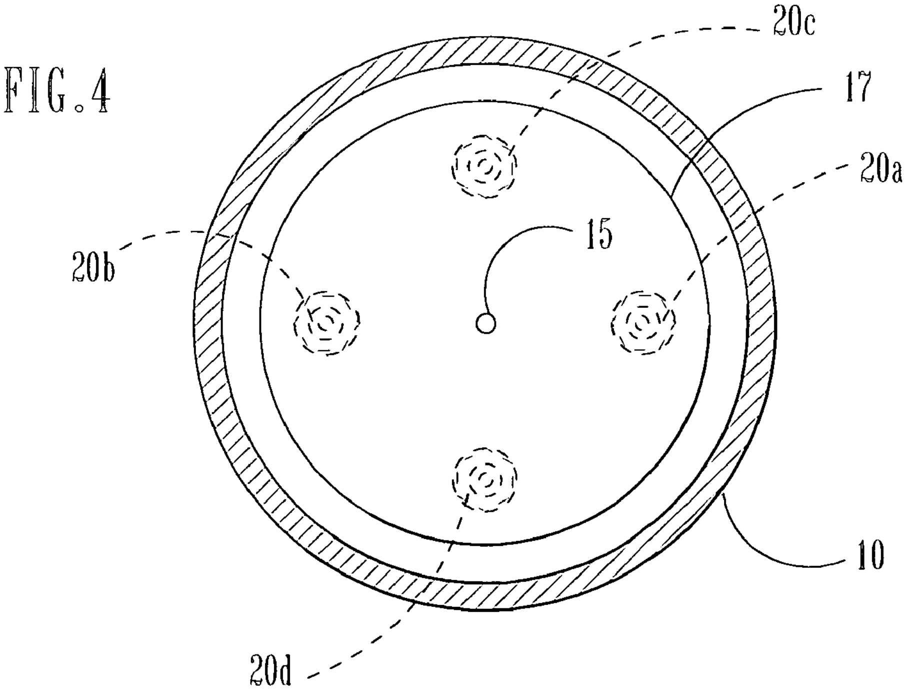
FIG. 4 shows a transverse vertical section taken as suggested by lines 4—4 of FIG. 2 with more detail shown of internal actuator positioning.

The opposite end of the housing 10 can be a round hollow thick disc in shape, with thin walls as best shown in the views of FIG. 4, FIG. 3, and FIG. 2. This particular shape can accommodate easy axially attachment of each of the eight valves 23*a*, 23*b*, 23*c*, 23*d*, 20*a*, 20*b*, 20*c*, 20*d* in eight mounting holes with the nut 19. Also this housing 10 shape provides a cavity between the stem tips of the valves 23*a*, 23*b*, 23*c*, 23*d*, and the stem tips of the valves 20*a*, 20*b*, 20*c*, 20*d*. This axial cavity space can accommodate the actuator 17. The actuator 17 can be attached to the lever 15 with a flat head screw (not shown). The internal length of the housing 10 cavity space should allow for the thickness of the actuator 17, plus the stem noses of all the valves 23*a*, 23*b*, 23*c*, 23*d*, 20*a*, 20*b*, 20*c*, 20*d*, plus a clearance of about 1⁄16 inch on each side of the actuator 17. The knob 16 can be attached to the lever 15 with a screw thread (not shown). All the valves 23*a*, 23*b*, 23*c*, 23*d*, 20*a*, 20*b*, 20*c*, 20*d*, 18*a*, 18*b*, 18*c*, 18*d* can be of a common type: spring return, normally closed, threaded body mount, 2 way, poppet quick opening or spool type. Commercial valves that have proven to operate well within the assembly 25 include model CO30510 made by Pneumadyne Company of Plymouth, Minn., 55442. However, there are many commercially available similar models and types made by other commercial valve manufacturers that can work very well in this application.

The fitting type (connection to a pressurized conduit 21*a*, 21*b*, 21*c*, 21*d*) throughout the system can be simple 10–32 gasket type barb tube fittings available in most hardware store outlets. The interconnecting conduits 21*a*, 21*b*, 21*c*, 21*d* can be made from standard ⅛ inch inside diameter polyurethane tubing as the fluid flow rate for pressurized actuators is nominal and ⅛ inch diameter porting can function well in the system.

The swivel joint 33 best shown in FIG. 2 can be constructed of the spherical bore 11 in the housing 10 about equal in radius to the radius of the ball 13. The spherical bore 11 should be just a little deeper than the ball 13 diameter. A thin disc shaped retainer plate 12 including a center clearance hole larger than the lever 15 diameter, and a series of mounting holes (not shown) for screw (not shown) attachment to the housing 10 can confine the ball 13 to proper swivel motion. The hole 14 through the ball 13 is just larger than the lever 15 diameter, so the lever 15 can move freely through the ball 13 in the axial direction. The lever 15 can be made of most metals with aluminum being an economical choice. A nylon swivel joint number 1071K14 sold by McMaster Carr Company of Los Angeles, Calif., 90054 can function well for the swivel joint 33 and includes the hole 14 as clearance for the lever 15.

The actuator 17 can be made of a rigid material such as metal or plastic. A spherical disc shape for the actuator 17 can be advantageous as this shape matches the radius of the distance from the swivel joint 33 to the actuator 17. With this shape, all portions of the actuator 17 will maintain a constant separation distance between valve stems of the valves 23*a*, 23*b*, 23*c*, 23*d*, 20*a*, 20*b*, 20*c*, 20*d* as the lever 15 tilts and as the actuator 17 moves from side to side within the housing 10 cavity. One practical diameter for the actuator 17 is about 2 inches, and a workable spherical radius of about 6 inches closely matches the shape of a commercially available frost plug model 550-028 made by Dorman Company of Colmar, Pa. 18915. The inside diameter of the housing 10 cavity near the actuator 17 should be significantly larger than the actuator 17 diameter so the actuator 17 motion is not impeded by the cavity wall as the actuator 17 moves about with the lever 15 tilting.

3. Alternate Embodiment—Multiple Operating Pressures

The former preferred embodiment of the assembly 25 uses the single pressure supply 26 as shown in FIG. 5 to supply the filling valves 23*a*, 23*b*, 23*c*, 23*d* which in turn inflate the air bags 27*a*, 27*b*, 27*c*, 27*d* to elevate the equipment 24. Realize that the heavy equipment 24 placed upon the upper positioning frame 29 must be exactly positioned and balanced with regard to weight distribution to the supporting air bags 27*a*, 27*b*, 27*c*, 27*d* or the elevating (lifting) of the equipment 24 will be tipped or biased. In a real life application, exact balancing is most difficult to accomplish.

A second replaceable embodiment of the assembly 25 can easily and simply compensate for this uneven weight distribution problem.

Note that the solution to this unbalanced weight distribution problem is an unexpected and unobvious result of the assembly 25. This solution evolved from awareness that the particular assembly 25 design includes four separate and independent pressurized subsystems: One subsystem comprises the valves 18*a*, 23*a*, and 20*a*, plumbed with the conduit 21*a*, which controls fluid pressure within the air bag 27*a*. A second subsystem comprises the valves 18*b*, 23*b*, 20*b* plumbed with the conduit 21*b*, which controls fluid pressure within the air bag 27*b*. Similarly, there are two more independent pressure subsystems controlling the fluid pressure within the other air bags 27*c* and 27*d*.

Integrating this understanding that there can be four independent pressure subsystems (one for each supporting air bag) with anticipated problem that there can be times when the air pressure elevating each of the four air bags 27*a*, 27*b*, 27*c*, 27*d* needs to be different from the other pressures unexpectedly led to a solution: If a pressure regulator was added between the pressure supply 26 and each of the fill valves 23*a*, 23*b*, 23*c*, 23*d*, then unbalanced equipment weight distribution can be compensated for by simple adjustment of pressure regulators supplying the four pressure subsystems.

Figure 6:
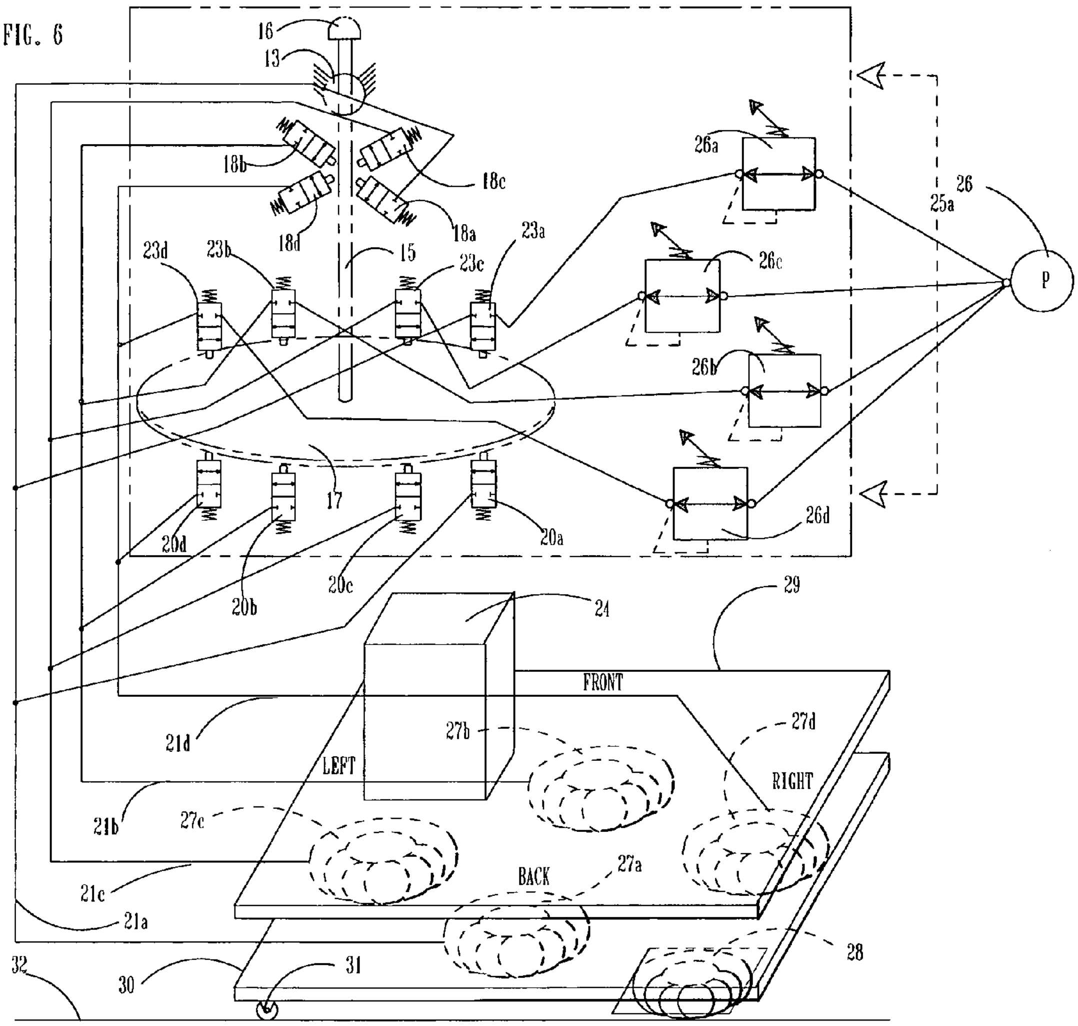
FIG. 6 shows a four pressure replaceable alternative embodiment of the single pressure system schematic of FIG. 5.

FIG. 6 shows this alternate embodiment to the assembly 25 which is identical to the preferred embodiment shown in FIG. 5 except the new assembly referred to as numeral 25*a* includes a set of four regulators 26*a*, 26*b*, 26*c*, 26*d*. The regulators 26*a*, 26*b*, 26*c*, 26*d* are plumbed in series between the pressure supply 26 and the four filling valves 23*a*, 23*b*, 23*c*, 23*d*. The regulators 26*a*, 26*b*, 26*c*, 26*d* can be simply attached to a bracket (not shown) bolted to the bottom of the housing 10. The regulators 26*a*, 26*b*, 26*c*, 26*d* are preferably of the self relieving type. Adjustment of the regulator 26*a* controls the lift force available to the air bag 27*a*. Adjustment of the regulator 26*b* controls the lift force available to the air bag 27*b*, and so forth. Using this unobvious embodiment of the assembly 25*a*, the upper positioning frame 29 can evenly or perpendicularly elevate the equipment 24 even if the heavy equipment 24 weight is unevenly distributed upon the upper positioning frame 29.

4. Alternate Embodiment—Including a Finger Motion Aid Cage

Figure 7:
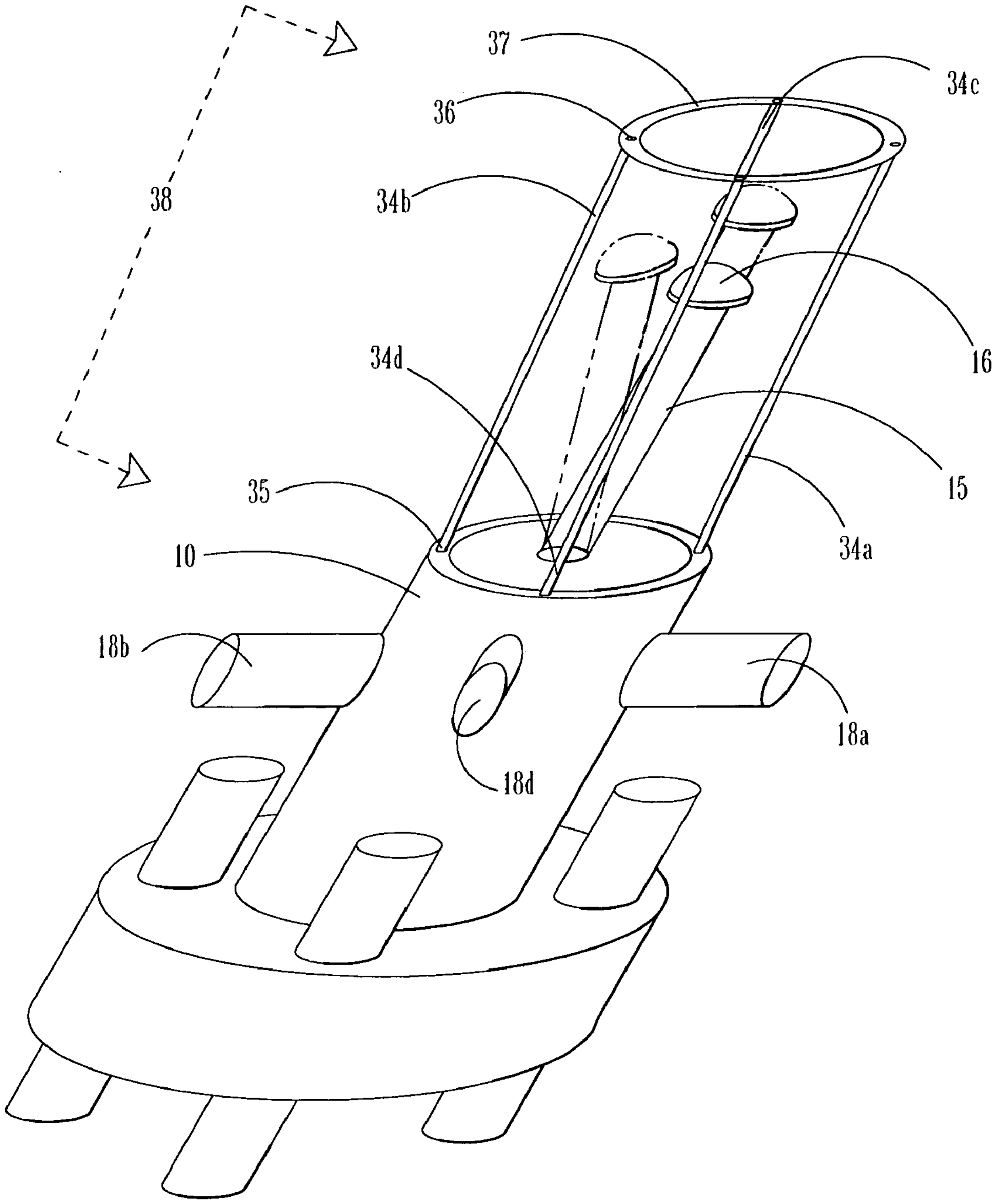
FIG. 7 shows an added finger motion aid cage alternative embodiment of the pressurized fluid controller using tilt/push/pull operator.

FIG. 7 shows an alternate embodiment of the assembly 25 which includes addition of a finger motion aid cage referred to as numeral 38. The finger motion aid cage 38 is constructed with a thin finger ring 37 secured to four finger supports 34*a*, 34*b*, 34*c*, 34*d* with four rod welds 36. The opposite ends of the finger supports 34*a*, 34*b*, 34*c*, 34*d* each be attached to the housing 10 by press fitting into a corresponding rod bore 35. The four finger supports 34*a*, 34*b*, 34*c*, 34*d* are placed around the housing 10 such that the finger supports 34*a*, 34*b*, 34*c*, 34*d* are spaced 90 degrees apart, near perpendicular to and on the axis of each of the valves 18*a*, 18*b*, 18*c*, 18*d*. With this design, the worker operating the assembly 25 can easily and effortlessly use two or three fingers of one hand to squeeze the lever 15 toward the particular finger support 34*a* or 34*b* or 34*c* or 34*d* corresponding to the equipment 24 pitch or roll positioning change desired. Two finger operation is significant because such finger squeeze guarantees a perfect angular tilt of the lever 15 toward the proper valve 18*a* or 18*b* or 18*c* or 18*d* without disturbing or activating other valves unintentionally. Second, this finger squeeze takes minimal effort for the worker to perform well and can be held a long time in an activated position without discomfort or fatigue. Third, the finger motion aid cage 38 forms a protective guard around the lever 15 and the knob 16 so that accidental activation cannot occur such as when something is bumped against or dropped on the assembly 25.

Using the finger motion aid cage 38, the worker operating the assembly 25 can easily and effortlessly use two or three fingers of one hand (or palm and two fingers of one hand) to either pull or push the knob 16 as the equipment 24 elevation changes are desired. Such finger against palm squeeze takes minimal effort for the worker to perform, can be accomplished with one hand operation, and can be held for a long time in the activating position without discomfort or fatigue.

5. Alternate Embodiment—Other Pneumatic Pressurized Positioners

The system of FIGS. 5 and 6 show how the assembly 25 interconnects to the air bags 27*a*, 27*b*, 27*c*, 27*d* and varies the heavy equipment 24 pitch, roll, and elevation as the lever 15 is manipulated. It is important to note that other pressurized positioner devices can perform similar functions as the air bags 27*a*, 27*b*, 27*c*, 27*d*. One such example (not shown) of alternate pressurized positioners are use of air cylinders and piston assemblies.

6. Alternate Embodiment—Hydraulic Pressurized Positioners and Hydraulic Valves in the Assembly 25

Although not intended, the forgoing embodiments may all have implied exclusively pneumatic components (e.g. air bags, air cylinders, etc.). Let it be understood that the valves 23*a*, 23*b*, 23*c*, 23*d*, 20*a*, 20*b*, 20*c*, 20*d*, 18*a*, 18*b*, 18*c*, 18*d* in the assembly 25 could be hydraulic valves, the pressure supply 26 could be hydraulic, and the air bags 27*a*, 27*b*, 27*c*, 27*d* could just as well be hydraulic cylinders (not shown).

7. Alternate Embodiment—Hydraulic Pressurized Positioners and Pneumatic Valves within the Assembly 25

The described preferred embodiment of the assembly 25 can have all the valves 23*a*, 23*b*, 23*c*, 23*d*, 20*a*, 20*b*, 20*c*, 20*d*, 18*a*, 18*b*, 18*c*, 18*d* pneumatic and the pneumatic pressure supply 26, but still be used to control pitch, roll and elevation of the equipment 24 which is supported by hydraulic pressurized positioners, such as hydraulic cylinders (not shown). This pneumatic to hydraulic embodiment (not shown) would include simple addition of four pneumatic to hydraulic valves in series between each hydraulic pressurized positioners and each of the corresponding pneumatic output conduits 21*a*, 21*b*, 21*c*, 21*d* of the assembly 25. Such pneumatic to hydraulic valves are common and well known to those working in the hydraulic industry. In addition, the system described in this embodiment (although external to the assembly 25) would include addition of a common hydraulic pressure system (not shown) to drive the hydraulic pressurized positioners. An important observation to be made from this embodiment is that the assembly 25 can easily control pitch, roll, and elevation of the equipment 24 supported by hydraulic positioners as well as supported by pneumatic positioners.

8. Alternate Embodiment—Valves Controlling Machinery Motion Other than Pitch, Roll, and Elevation The assembly 25 design allows for extra axially direction (pulling and pushing) valve actuation beyond that of other joy stick type operated pressurized controllers (which provide only tilting direction valve actuation). The previous embodiments all used the tilting valve control to vary the equipment 24 pitch and roll, and used the unique pull and push valve control to vary the equipment 24 elevation.

However, the assembly's 25 unique expanded valve design is capable of controlling other pressurized functions on machinery. For one example (not shown), the radial valves 18*a*, 18*b*, 18*c*, 18*d* can control pressurized actuators attached to an automobile seat which slide the seat forward and backward and tilt the seat angle frontward or backward. In this example, the axial valves 23*a*, 23*b*, 23*c*, 23*d*, 20*a*, 20*b*, 20*c*, 20*d* can control pressurized air bags attached to the seat which raise or lower the seat.

As another example (not shown), the radial valves 18*a*, 18*b*, 18*c*, 18*d* can control air cylinders attached to a tractor plow which move the blade up and down and tilt the blade left or right. In this same example, the axial valves 23*a*, 23*b*, 23*c*, 23*d*, 20*a*, 20*b*, 20*c*, 20*d* can control air motors attached to tractor drive wheels which move the tractor forward or backward.

The versatility of the assembly 25 beyond equipment pitch, roll, and elevation control is quite broad and is resultant from the assembly 25 design including the extra and very useful axial valve push and pull control beyond only the tilting valve control of other joy stick pressure controllers. One hand intuitive operation of a simple, single lever controller without need to activate additional electrical switches or activate additional valves opens countless new applications for the invention assembly 25 which are unexpected and unobvious.

For purposes of exemplification, particular embodiments of the invention have been shown and described to the best understanding thereof. However, other embodiments can include other valve types arranged in other positioning configurations activated by other configurations of lever operators as the lever operator is tilted, pulled, or pushed to accomplish a wide variety of pressurized actuator control, irrespective of particular structure configuration and materials without departing form the spirit and scope of the claimed invention.

I claim:

1. A pressurized fluid control mechanism including tilt/push/pull operation comprising:

a. a housing;

b. a lever operator;

c. a swivel joint secured to and supportive of said lever operator in a manner allowing said lever operator both tilting motion and axial motion;

d. an actuator means extending radially reach of said lever operator and capable of applying actuation forces is attached to said lever operator and movable therewith;

e. a first series of valves is attached to said housing and arranged about said lever operator axis so as to be selectively actuated by tiltable movement of said lever operator;

f. a second series of valves is attached to said housing and arranged circularly about said lever operator and near said actuator means so as to be actuable by upward axial motion of said actuator means;

g. a third series of valves is attached to said housing and arranged circularly about said lever operator and near said actuator means so as to be actuable by downward axial motion of said actuator means.

2. The pressurized fluid control mechanism including tilt/push/pull operation of claim 1, including a pressure regulator plumbed in series with each valve of said second series of valves wherein each of said valves of second series of valves can control with it's own unique pressure.

3. The pressurized fluid control mechanism including tilt/push/pull operation of claim 1, including a pressure regulator plumbed in series with each valve of said third series of valves wherein each of said valves of third series of valves can control with it's own unique pressure.

4. The pressurized fluid control mechanism including tilt/push/pull operation of claim 1, including a means surrounding said lever operator capable of assisting accurate angular alignment by said lever operator to specific valve of said first series of valves, and with minimal chance for accidental activation of other valves of said first series valves.

* * * * *

UNITED STATES PATENT AND TRADEMARK OFFICE

CERTIFICATE OF CORRECTION

PATENT NO. : 7,066,198 B2
APPLICATION NO. : 10/749968
DATED : June 27, 2006
INVENTOR(S) : Jason L. Smith It is certified that error appears in the above-identified patent and that said Letters Patent is hereby corrected as shown below:

“Col 1, Title page, item [76] Inventor: Jason L. Smith, change ‘Junction Way, San Jose, CA (US) 95131’ to --420 Strafford Ave 3D, Wayne, PA (US) 19087--.”

Signed and Sealed this

Twenty-eighth Day of November, 2006

JON W. DUDAS
*Director of the United States Patent and Trademark Office*